United States Patent
Dörrich et al.

(10) Patent No.: US 11,203,606 B2
(45) Date of Patent: Dec. 21, 2021

(54) METHOD FOR CONTINUOUSLY PRODUCING LOW-ALKOXY BRANCHED SILOXANES

(71) Applicant: WACKER CHEMIE AG, Munich (DE)

(72) Inventors: Steffen Dörrich, Munich (DE); Richard Weidner, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 329 days.

(21) Appl. No.: 16/330,563

(22) PCT Filed: Feb. 1, 2017

(86) PCT No.: PCT/EP2017/052184
§ 371 (c)(1),
(2) Date: Mar. 5, 2019

(87) PCT Pub. No.: WO2018/141383
PCT Pub. Date: Aug. 9, 2018

(65) Prior Publication Data
US 2021/0284665 A1    Sep. 16, 2021

(51) Int. Cl.
*C08G 77/06* (2006.01)
*C07F 7/08* (2006.01)
*C08G 77/00* (2006.01)

(52) U.S. Cl.
CPC ............ *C07F 7/0874* (2013.01); *C08G 77/06* (2013.01); *C08G 77/70* (2013.01)

(58) Field of Classification Search
CPC ............................ C08G 77/06; C07F 7/0874
See application file for complete search history.

(56) References Cited

U.S. PATENT DOCUMENTS

| | | | |
|---|---|---|---|
| 6,767,982 B2 * | 7/2004 | Standke | C07F 7/0872 528/10 |
| 7,514,518 B2 * | 4/2009 | Schattenmann | C08G 77/06 528/10 |
| 9,988,496 B2 * | 6/2018 | Sandmeyer | C08G 77/18 |
| 10,125,225 B2 * | 11/2018 | Sandmeyer | C08G 77/18 |
| 2018/0265640 A1 * | 9/2018 | Sandmeyer | C08G 77/18 |

FOREIGN PATENT DOCUMENTS

DE     102005003899 A1    8/2006

* cited by examiner

*Primary Examiner* — Margaret G Moore
(74) *Attorney, Agent, or Firm* — Brooks Kushman P.C.

(57) ABSTRACT

Branched organopolysiloxanes and organopolysiloxanes with low alkoxy content are produced in a first reaction unit by continuous feed of organohalosilanes and alcohol to a reaction vessel surmounted by a distillation column, the vessel containing an excess of water relative to the halogen content of the organohalosilanes. A second reaction unit for removing volatiles from the product from the first reaction unit is also preferably employed.

13 Claims, No Drawings

METHOD FOR CONTINUOUSLY PRODUCING LOW-ALKOXY BRANCHED SILOXANES

CROSS REFERENCE TO RELATED APPLICATIONS

This application is the U.S. National Phase of PCT Appln. No. PCT/EP2017/052184 filed Feb. 1, 2017, the disclosure of which is incorporated in its entirety by reference herein.

BACKGROUND OF THE INVENTION

1. Field of the Invention

The invention relates to a method for the continuous production of low-alkoxy branched siloxanes.

2. Description of the Related Art

DE 102005003899 A describes a method for the continuous production of low-alkoxy silicone resins. If this invention is adapted to the synthesis of branched silicone oils and low-viscosity silicone resins, an accumulation of $R_3SiCl$ occurs at the top of the column because of the relatively high concentration of trialkylsilyl units required therefor, especially $Me_3Si$— units, which ultimately leads to termination and non-practicability of the process.

It was therefore an object of the invention to provide a column method which enabled the advantages of a continuous column-containing production even for three-dimensionally crosslinked low-alkoxy organosiloxanes (silicone oils and silicone resins).

SUMMARY OF THE INVENTION

The subject of the invention is a continuous method for producing organosiloxanes (O) by reacting a silicon compound 1 of general formula 1

$$R_nSiHal_{4-n} \quad (1),$$

and silicon compound 2, which is selected from silicon compound of general formula 2a or silicon compounds of general formula 2b or mixtures of silicon compounds of general formula 2a and 2b $$R^1{}_3SiHal \quad (2a),$$

$$R^1{}_3Si\text{—}O\text{—}SiR^1{}_3 \quad (2b),$$

wherein
R is hydrogen or a C1-C12 hydrocarbon radical,
$R^1$ is hydrogen or a C1-C7 hydrocarbon radical,
Hal is fluorine, chlorine, bromine or iodine, and
n has a value of 0 or 1, with alcohol and water in the presence of organosiloxane (O) in a reaction unit comprising a distillation column and a vessel (V) containing organosiloxane (O) arranged thereunder, wherein the content of the vessel is heated to boiling under reflux, silicon compound 1 is introduced into the column above the lower end of the column, silicon compound 2 is introduced into the vessel (V), hydrogen halide formed during the process is removed by means of the distillation column, and organosiloxane (O) is constantly drawn off from the vessel to the extent to which is it formed, wherein silicon compound 1, silicon compound 2, alcohol and water are constantly supplied to the reaction unit in such amounts that there is always more water contained in the reaction unit than can be consumed by the supplied silicon compound 1 and silicon compound 2.

DETAILED DESCRIPTION OF THE PREFERRED EMBODIMENTS

The silicon compound 2 introduces the $R^1{}_3Si$— units into the organopolysiloxane (O). The silicon compound 2 is not, in contrast to that which is described in DE 102005003899 A, introduced into the column, but rather directly into the vessel (V) containing water. Thus, the above-described accumulation of silicon compounds of general formula 2a does not occur.

Hydrogen halide is released by the hydrolysis and alcoholysis of silicon compounds 1, 2a and 3. The hydrogen halide catalyzes the hydrolysis, alcoholysis and condensation reactions. By way of example, the reaction of $R^1{}_3Si$—O—$SiR^1{}_3$ to give $R^1{}_3SiOH$ or $R^1{}_3SiOR''$. R'' is defined below.

It is essential for the process that silicon compound 2 is directly introduced into the vessel (V) containing water, since in the absence of water, an equilibrium, catalyzed by hydrogen halide, of $R^1{}_3SiOR''$ (see previous paragraph), hydrogen halide, alcohol and $R^1{}_3SiHal$ arises, which by way of example in the case of

lies significantly to the side of $Me_3SiCl$. In the process, the equilibrium is also influenced by the fact that $Me_3SiCl$ in this example is the lowest-boiling component (lower than ethanol) and hence is distilled from the bottom. As a result, further $Me_3SiCl$ is formed in accordance with the above equation. Conversely, in the presence of water, this equilibrium plays a less important role, since water preferentially reacts with $R^1{}_3SiHal$ and $R^1{}_3SiOR''$.

Even with other alkoxysilanes occurring intermediately in the process (by way of example $Si(OEt)_4$, $MeSi(OEt)_3$ and $Me_2Si(OEt)_2$), a similar equilibrium arises with HCl, which however lies even more significantly to the side of the pure alkoxysilane.

The water is consumed by the Si-halogen units of the silicon compound 1 and silicon compound 2, and hydrogen halide is formed. Under the conditions prevailing in the process, hydrogen halide dissolves in the mixture present in the vessel (V) to saturation. Further hydrogen halide is then removed by means of the distillation column and can be recycled.

Preferably, the dissolved amount of hydrogen halide is between 40000 and 100,000 ppm, more preferably between 60,000 and 80,000 ppm, and most preferably between 65,000 and 75,000 ppm, in each case based on the total weight of the liquid phase in the vessel (V) of the first reaction unit.

The concentration of the hydrogen halide can be controlled by the amount of water used, the amount of ethanol used, by introducing an inert gas into the vessel (V) and by introducing hydrogen halide- and $R^1{}_3SiCl$-containing top distillate/return fraction into the vessel (V) of the reaction unit.

Preferably, the silicon compounds 1 and 2, alcohol and water are introduced into the reaction unit in such amounts that there is at least 3 wt % of water, more preferably at least 5 wt %, and most preferably 7-16 wt % of water present in the vessel (V), in each case based on the total weight of the liquid phase in the vessel (V).

Preferably, the silicon compounds 1 and 2, alcohol and water are introduced into the reaction unit in such amounts that there is at least 20 wt % of alcohol, more preferably at least 30 wt %, and most preferably 35-45 wt % of alcohol present in the vessel (V), in each case based on the total weight of the liquid phase in the vessel (V).

Preferably, before introducing the silicon compounds 1 and 2 to be reacted into the distillation column, a mixture of alcohol, disiloxane (silicon compound 2a), organosiloxane (O) and also water are heated to boiling under reflux in the vessel (V).

Examples of C1-C7 or C1-C12 hydrocarbon radicals R and $R^1$ are methyl, ethyl, vinyl, n-propyl, i-propyl, allyl, n-butyl, i-butyl, n-pentyl, i-pentyl, n-hexyl, i-hexyl, cyclohexyl, n-heptyl, n-octyl, i-octyl, phenyl and tolyl radicals; additionally, monovalent hydrocarbon radicals substituted by atoms or groups that are inert to the alcohol and water used in each case under the respective reaction conditions, in which the carbon atoms to which halogen is bonded are in the alpha position or at least in the gamma position relative to the Si atom, e.g. gamma-chloropropyl radical; and haloaryl radicals, e.g. chlorophenyl radicals. A further example of suitable substituted hydrocarbon radical is the beta-cyanoethyl radical.

Particular preference is given to methyl, vinyl, n-propyl, n-butyl, i-octyl and phenyl radicals.

R and $R^1$ are more preferably a methyl, ethyl, n-propyl, vinyl or a phenyl radical. R and $R^1$ are most preferably a methyl or vinyl radical.

The halogen atom Hal is preferably chlorine.

Tetrachlorosilane, methyltrichlorosilane (MeSiCl$_3$), vinyltrichlorosilane (ViSiCl$_3$), phenyltrichlorosilane (PhSiCl$_3$) or propyltrichlorosilane (PrSiCl$_3$) are preferred as silicon compound 1.

Me$_3$SiCl or chlorodimethylvinylsilane (ViMe$_2$SiCl) are preferred as silicon compound 2a.

Me$_3$Si—O—SiMe$_3$ (hexamethyldisiloxane) and 1,3-divinyl-1,1,3,3-tetramethyldisiloxane (ViMe$_2$Si—O—SiMe$_2$Vi) are preferred as silicon compound 2b.

Mixtures of different silicon compounds 1 and silicon compounds 2 can be used.

Preferably, 50 to 1000, more preferably 60 to 600, and especially 200 to 480 parts by weight of silicon compounds 2 are introduced per 100 parts by weight of silicon compounds 1.

By virtue of the possible high proportion of silicon compound 2, it is also possible to produce, as well as resins, low-viscosity organosiloxanes (e.g. tristrimethylsiloxymethysilane (TM3) or tetrakistrimethylsiloxysilane (QM4)) with a high degree of purity using the described process.

Due to the high proportion of silicon compound 2, no gelling or silicification phenomena occur during the process, since silicon compound 2b (formed inter alia also from 2a and water) occurs not only as starting material but also additionally as solvent and reaction mediator.

The weight ratio of silicon compound of general formula 2b to silicon compound of general formula 2a can be as desired.

Preferably, the weight ratio of silicon compound of general formula 2b is 0.1 to 5, especially 0.5 to 2.

In a particular embodiment, the weight ratio of silicon compound of general formula 2b is at least 5, especially at least 10 and most particularly preferably only silicon compound of general formula 2b is used.

The distillation column is then particularly released from the burden of the hydrogen halide load and the throughput through the reaction unit (space time yield) can be significantly improved.

In a particular embodiment, exclusively silicon compound 1 of general formula 1 is used, in which n is 0, and silicon compound 2. In particular, tetrakistrimethylsiloxysilane is produced from SiCl$_4$ and silicon compound 2, which is selected from Me$_3$SiCl and/or Me$_3$Si—O—SiMe$_3$.

In a further particular embodiment, additionally silicon compound 3

$$R^1{}_2SiHal_2 \qquad (3),$$

can be introduced. The definitions of $R^1$ and Hal are described above. Silicon compound 3 can be introduced into the vessel (V) or into the column above the lower end of the column. Preferably, silicon compound 3 is introduced into the vessel (V).

If silicon compounds 3 are used, preferably 1 to 50, more preferably 5 to 20 parts by weight of silicon compounds 3 are introduced per 100 parts by weight of silicon compounds 1.

The silicon compounds 1 may be introduced in liquid or vaporous form into the distillation column. Silicon compounds 1 are preferably introduced in the middle of the column and more preferably in the top third of the column of the first reaction unit. Silicon compounds 2 are preferably introduced in liquid form into the vessel (V).

As alcohols, for example, use may be made of all hydrocarbon compounds having an alcoholic hydroxyl group which have are used for the production of alkoxysilanes or organosiloxanes by reaction of chlorosilane with alcohols and optionally water and the boiling point of which is below that of each organosiloxane (O) to be produced.

As alcohols, preference is given to those of general formula R"OH, in which R" is a monovalent aliphatic hydrocarbon radical having 1 to 8 carbon atoms.

The abovementioned examples of aliphatic hydrocarbon radicals R, as long as these comprise 1 to 8 carbon atoms, also apply, with the exception of the vinyl radical, for the radical R". However, preference is given to alkyl radicals for R". Examples of the alcohols which can be used in the context of the invention are methanol, ethanol, n-propanol, isopropanol, n-butanol, isobutanol, tert-butanol, beta-methoxyethanol, n-hexanol and 2-ethylhexanol. Mixtures of different alcohols may be used.

Particular preference is given to alkanols and alkanols substituted with an ether oxygen atom, in each case having 1 to 6 carbon atoms, such as methanol, ethanol, beta-methoxyethanol, n-propanol, isopropanol, n-butanol and n-hexanol. Particular preference is given to methanol, ethanol and isopropanol.

If desired, further substances may also be used in the first step of the inventive method in addition to silicon compound 1, 2, 3, water and alcohol. Examples of optionally used further substances are alkoxysilanes, such as tetraethoxysilane or trimethylethoxysilane and silanols such as trimethylsilanol. These may be introduced into the reaction unit at any desired position; preferably into the first reaction unit, more preferably into the vessel of the first reaction unit.

Optionally, an organic solvent which does not react with the organosiloxane (O) is also expediently included. This is especially preferred if the resultant organosiloxane (O) is a solid resin in the cooled state or has a high viscosity. The solvent enables the uptake thereof and thereby creates a viscosity for the resin solution which allows it to be handled. All conventional organic solvents are suitable as solvent.

Use is preferably made of aprotic organic solvents, preferably hydrocarbons such as, for example, hexane, heptane, toluene or xylene. Mixtures can also be used.

The inventive method is preferably carried out at the pressure of the surrounding atmosphere, i.e. at 0.8 to 1.1 bar, because working at the pressure of the surrounding atmosphere does away with expenditure for e.g. corrosion-resistant pumps. However, if made necessary or expedient by the position of the boiling points of the reactants, it can also be carried out at higher or lower pressures.

Preferably, the mixture comprising the organosiloxane (O) obtained from the above-described reaction unit is passed into a second reaction unit and heated there to a temperature at which volatile constituents, which are intended here preferably to mean water, HCl, alcohol, disiloxane (silicon compound 2b; $R^1_3Si$—O—$SiR^1_3$), monofunctional alkoxysilane ($R^1_3SiOR''$) and monofunctional silanol ($R^1_3SiOH$), are completely or partially removed from the mixture, wherein the volatile constituents are preferably recycled from the second reaction unit back into the first reaction unit, and organosiloxane (O) is constantly drawn off from the bottom of the second reaction unit to the extent to which it is formed. Preferably, the second reaction unit is also a reaction unit comprising a distillation column, optionally a reflux condenser and a vessel comprising an already desired organosiloxane (O). By introducing an inert gas into the vessel of the second reaction unit, the removal of volatile constituents, especially HCl, from the desired organosiloxane (O) can be promoted. Preferably, the concentration of the hydrogen halide is controlled by introducing an inert gas in the bottom of the column of the second reaction unit.

As a result of the distillate from the second reaction unit being recycled back into the first reaction unit, no acidic wastewater phase arises.

In this case, it is important that the first reaction unit is constantly supplied with silicon compound 1, silicon compound 2, alcohol and water in such amounts that together the reaction units always contain more water than can be consumed by the supplied silicon compound 1 and silicon compound 2.

Silicon compound 2, especially 2b, can be added directly into the first or else into the second reaction unit, since volatile constituents of the second reaction unit are recycled back into the vessel (V) of the first reaction unit. Preferably, the metered addition is carried out into the vessel (V) of the first reaction unit.

The recycling of the volatile constituents from the second reaction unit back into the vessel (V) of the first reaction unit is preferably carried out as distillate or gas.

If aprotic organic solvent is supplied, this is preferably supplied to the second reaction unit.

In the context of the present invention, it was observed that an excess of water during the reaction made it possible to control the condensation. The inventive method thus makes it possible to use the column method for the production of any desired low-alkoxy and low-silanol silicone oils and silicone resins as organosiloxane (O). Most preferably, low molecular weight low-alkoxy and low-silanol silicone oils can be produced.

"Low-alkoxy" silicone oils or resins is understood to mean preferably silicone oils or resins having an alkoxy content of at most 7 wt % based on the total weight of the organosiloxane continuously removed from the second reaction unit (including 10-20% disiloxane), more preferably silicone oils or resins having an alkoxy content of at most 3 wt %, most preferably of at most 1 wt %, based on the total weight of the organosiloxane continuously removed from the second reaction unit (including 10-20% disiloxane).

Low-silanol silicone oils or resins is understood to mean preferably silicone oils or resins having a silanol content of at most 1 wt % based on the total weight of the organosiloxane continuously removed from the second reaction unit (including 10-20% disiloxane), more preferably silicone oils or resins having a silanol content of at most 0.5 wt %, and most preferably of at most 0.1 wt %, based on the total weight of the organosiloxane continuously removed from the second reaction unit (including 10-20% disiloxane).

The hydrogen halide formed in the reaction in the first reaction unit preferably has the condensable fractions removed therefrom at the top of the reaction unit 1, which are in turn recycled back into the reaction unit, and is therefore available as gas for recycling.

The inventive excess of water in the reaction unit is preferably established such that even when filling the reaction unit prior to the start of the continuous reaction, water is supplied in excess. Preferably, the water content is subsequently kept constant, for example by an amount of water being continuously supplied to the extent that it is consumed/released by the hydrolysis/condensation. The water may be directly added into the first or else into the second reaction unit, since volatile constituents from the second reaction unit are recycled back into the vessel (V) of the first reaction unit. Preferably, the water is metered into the first reaction unit. More preferably, the water is metered into the vessel (V) of the first reaction unit. In order to lower the HCl content of the product, however, it may be advantageous to meter water into the column of the second reaction unit.

Alternatively, the excess of water in the reaction unit may be achieved by metering in more water at the start of the continuous reaction than is consumed by the Si-Hal units provided by the silicon compounds 1, 2 and optionally 3 until the required excess of water is present in the system.

Alcohol is used to control the reaction unit. The amount metered in continuously depends on the extent to which it is consumed by the residual alkoxy groups remaining on the resultant organosiloxane (O). The alcohol may likewise be supplied into both reaction units, but is preferably supplied into reaction unit 1. In order to lower the HCl content of the product, however, it may be advantageous to meter alcohol into the column of the second reaction unit.

The distillation column used in the method according to the invention may be any tube which is usually provided with random packings or internals and which may also be used for fractionation in a fractional distillation, for example a column with random packing. There is no crucial upper limit for the column length. If the column is too short to ensure sufficient reflux actually within the column, it is of course also necessary to equip it with a condensation unit (for example reflux condenser). The vessel (V) may be configured, for example, as a still, evaporation flask, bottom evaporator, or preferably a circulation evaporator.

The distillation column-containing reaction unit with vessel (V) preferably consists of a column with a circulation evaporator. For the second reaction unit, any heatable unit which enables volatile constituents to be removed is available in principle, in order to conduct these constituents back into the first reaction unit; for example short-path evaporators, falling-film evaporators or thin film evaporators. Preference is given to using units which likewise comprise a column, the reaction mixture of the first reaction unit expediently being introduced as close as possible to the top of the second reaction column. More preferably, this is a column with a circulation evaporator.

Since the first reaction unit generally comprises the greatest proportion of water, it may be that the bottom of the vessel (V) of the first reaction unit is a biphasic mixture. Preferably, however, silicon compound 1, 2, 3, alcohol and water are introduced into the reaction unit in such amounts that, at the pressure prevailing in the column in each case and at the temperature prevailing in the column bottom, a single-phase substance mixture is present in the column bottom and for the prevailing natural circulation (when using a circulation evaporator), the mixture separates into two phases on cooling.

In order not to introduce a pure alcoholic acidic aqueous phase into the second reaction unit from the bottom of the first reaction unit, preference is given to a phase separation connected between the two reaction units. Often, merely a calming zone is sufficient for phase separation between the reaction units, but any phase separation process is conceivable in principle. Preference is given to a phase separation based on coalescer units. In order to promote the phase separation, it may be expedient to bring the mixture taken off from the column bottom and comprising the desired organosiloxane to a temperature of less than 60° C., preferably less than 40° C., more preferably less than 30° C. The silane/siloxane phase obtained in this way is expediently introduced as close as possible to the top of the second reaction unit, and the alcoholic acidic aqueous phase obtained is recycled into the vessel (G) of the first reaction unit. The advantage of this is that the second reaction unit does not have to volatilize alcoholic acidic water and can therefore be of smaller dimensions. In addition, the energy expenditure is reduced, as is the risk of HCl being introduced into the vessel (in the bottom) of the second reaction unit and leading there to catalytic equilibration of the desired organosiloxane. The second reaction unit thus only has to transfer the volatile constituents of the silane/siloxane phase (silanes such as $R^1_3SiOR$, traces of alcohol, water and HCl and a majority of the disiloxane (silicon compound 2b)) into the first reaction unit.

The temperature in the first reaction unit is preferably less than 100° C., more preferably less than 90° C. The temperature in the second reaction unit is preferably greater than the temperature in the first reaction unit, more preferably 5° C. to 10° C. greater than the boiling point of the respective disiloxane (silicon compound 2a); if a solvent is present, however, it is preferably not greater than the boiling point thereof.

The temperature in the column bottom of the first reaction unit is preferably less than 100° C.

The temperature in an intermediate section of the reaction column 1 is preferably at least 0.5° C. greater than the boiling point of the alcohol used, at the pressure prevailing in the respective column, such that the temperature gradually increases from the top to the bottom of the column.

The temperature at the top of the column of the first reaction unit is preferably set such that over the course of the entire reaction there is always excess alcohol that boils under reflux.

The organosiloxanes or organosiloxane solutions obtained from the second reaction unit are already very low in hydrogen halide, such that they are storage stable for days both as pure substance and as siloxane solution.

Preferably, the dissolved amount of hydrogen halide in the organosiloxanes or organosiloxane solutions of the second reaction unit is between 0 and 100 ppm, more preferably between 0 and 50 ppm, most preferably between 0 and 20 ppm, in each case based on the total weight of the liquid phase in the vessel of the second reaction unit.

The oligosiloxanes obtainable according to the invention are suitable either as silicone oils or as silicone resins, depending on the viscosity.

Further workup can be carried out either batchwise or continuously. Owing to the particular preparation, preference is given to a continuous workup, on the industrial scale, for example by means of a short-path evaporator, a falling-film evaporator, a thin-film evaporator or a distillation column, in order to remove disiloxane (compound 2b, $R^1_3Si$—O—$SiR^1_3$) that is still present or optionally additional solvent. The silicone oils obtained in this way are suitable for use as heat carrier oil, damper oil, hydraulic oil or in cosmetic applications in creams, washing lotions or haircare compositions. The silicone resins obtained in this way are suitable for all known applications. Such applications are for example the use as binders, predominantly in coatings or as electrical insulation or as release-force regulators in paper coating.

All the above symbols of the above formulae each have their definitions independently of one another. In all formulae, the silicon atom is tetravalent. The sum of all constituents of the silicone mixture adds up to 100 wt %.

In the following examples, unless indicated otherwise, all reported amounts and percentages are based on weight, all pressures are 0.10 MPa (abs) and all temperatures are 20° C.

Analysis

Measuring the Amount of Disiloxane, M, D, T and Q Groups ($^{29}$Si-NMR)

The proportion of disiloxane, M ($R_3SiO_{1/2}$), D ($R_2SiO_{2/2}$), T ($RSiO_{3/2}$) and Q-($SiO_{4/2}$) groups in the product was determined by means of nuclear magnetic resonance spectroscopy. The $^{29}$Si nuclear magnetic resonance spectra were recorded using a Bruker Avance 300 Spectrometer ($^{29}$Si: 59.6 MHz) with a 10 mm quattro nucleus probe (QNP). The measurements were carried out with the INEPT pulse sequence or with the inverse gated pulse sequence (quartz glass tubes, NS=1024; 2000 mg siloxane in 1000 µl of a 1% strength solution of $Cr(acac)_3$ in $C_6D6$/toluene). The integral of the M, D, T and Q values was related to the total sum of the values of the integrals for M groups (chain-end $R^3SiO_{1/2}$), D groups (chain members $R_2SiO_{2/2}$), T groups (branching points $RSiO_{3/2}$) and Q-Gruppen (crosslinking points $SiO_{4/2}$) (% M, % D, % T and % Q). The examples give in each case the content of M, D, T and Q groups of the desired organosiloxane, i.e. disregarding the integral of the disiloxane present to 10-20% (exact content is given in the respective examples) (hexamethyldisiloxane, 1,3-diethyl-1,1,3,3-tetramethyldisiloxane and 1-diethyl-1,1,3,3,3-pentamethyldisiloxane and 1,3-divinyl-1,1,3,3-tetramethyldisiloxane). The content of disiloxane in the product was determined by $^{29}$Si-NMR.

Measuring the Ethoxy and Silanol Content ($^1$H and $^{29}$Si NMR)

The ethoxy and silanol content was determined by means of nuclear magnetic resonance spectroscopy (the 1H nuclear magnetic resonance spectra were recorded using a Bruker Avance 500 Spectrometer ($^1$H: 500.1 MHz) with a 5 mm broadband (BBO) probe (NS=128; 50 mg siloxane in 1000 µl $CDCl_3$). The $^{29}$Si nuclear magnetic resonance spectra were recorded using a Bruker Avance 300 Spectrometer ($^{29}$Si: 59.6 MHz) with a 10 mm quattro nucleus probe (QNP). The measurements were carried out with the INEPT pulse sequence or with the inverse gated pulse sequence (quartz glass tubes, NS=1024; 2000 mg siloxane in 1000 µl of a 1% strength solution of $Cr(acac)_3$ in $C_6D6$/toluene). The ethoxy and silanol groups were detected using $^1$H NMR. The respective integrals were converted into wt % taking into account the number of protons, the M to D to T to Q ratio (using $^{29}$Si NMR; see above) and the molar mass of the units (ethoxy: $CH_3CH_2O_{1/2}$, Mw=37 g/mol; silanol: $HO_{1/2}$, Mw=9 g/mol). The percentages reported in each case for the ethoxy and silanol contents are related to the mass of the desired organosiloxane including the disiloxanes present to 10-20% (more precise content given in the respective examples) (hexamethyldisiloxane, 1,3-diethyl-1,1,3,3-tetramethyldisiloxane and 1-diethyl-1,1,3,3,3-pentamethyldisiloxane and 1,3-divinyl-1,1,3,3-tetramethyldisiloxane).

Gas Chromatography

In order to control the process, the composition of the mixture in the vessel (V) of the first reaction unit was investigated using gas chromatography. A sample of the mixture was taken from the vessel (G) of the first reaction unit and cooled to below 35° C. until two stable phases had formed. The ratio of the phases was determined volumetrically and kept constant in the process by controlling the metered addition. The composition of the individual phases was analyzed using gas chromatography (Agilent 7890A, siloxane phase: DB-1701 (30 m, 0.32 mm, 1.00 μm, detector (FID); alcohol phase: HP-5 (30 m, 0.32 mm, 0.25 μm), detector (TCD)) and accordingly the amounts of alcohol, water and disiloxane (silicon compound 2a) were kept constant in the process by controlling the metered addition.

Titration

The hydrogen halide concentration of the mixture from the vessel (V) of the first reaction unit was determined by means of titration against 0.1 N ethanolic KOH.

Tetrabromophenolphthalein ethyl ester was used as indicator. The sample to be analyzed was diluted in isopropanol/toluene (1:1 (v/v)).

The hydrogen halide concentration of the product was determined by titration against 0.01 N ethanolic KOH.

Tetrabromophenolphthalein ethyl ester was used as indicator. The sample to be analyzed was diluted in isopropanol/toluene (1:1 (v/v)).

Exemplary Embodiments

An apparatus consisting of two reaction units was used in the examples: the first reaction unit consists of a circulation evaporator (=vessel (V)) with a fill volume of 1351 and a 10 m-long column with an internal width of 200 mm placed thereon. The second reaction unit consists of a circulation evaporator with a fill volume of 1351 and a 6 m-long column with an internal width of 200 mm placed thereon. The column of the first reaction unit firstly has, at the top, a water-driven condenser (flow temperature approximately 20° C.) and then a brine-driven condenser (flow temperature approximately −10° C.). The distillates obtained therein are fed back into the first reaction unit. The hydrogen halide gas present downstream of the condenser can be recovered. The column of the second reaction unit firstly has, at the top, a water-driven condenser (flow temperature approximately 20° C.) and then a brine-driven condenser (flow temperature approximately −10° C.). The distillates obtained therein are fed back into the vessel (V) of the column of the first reaction unit. The hydrogen halide gas present downstream of the condenser can be recovered.

As much reaction mixture is continuously discharged by a pump from the circulation evaporator of the first reaction unit as is obtained by the reaction and the distillate recycling. The reaction mixture from the circulation evaporator of the first reaction unit is supplied at the top, directly beneath the condensation unit of the second column.

Product is likewise removed from the circulation evaporator of the second reaction unit to the extent to which it has been formed.

Example 1: Tetrakis(trimethylsiloxy)silane

The 1351 circulation evaporator of the first reaction unit is charged as follows:

26.5 kg of the desired organosiloxane 17 kg of hexamethyldisiloxane 28.5 kg of ethanol 7 kg of water The 1351 circulation evaporator of the second reaction unit is charged with 75 kg of the desired organosiloxane and 22 kg of hexamethyldisiloxane.

The reaction units are heated by means of the circulation evaporator until a stable distillation equilibrium is reached in the columns. Subsequently, the continuous metered addition is started as follows:

$SiCl_4$ is fed in at 48 kg/h 2 m below the top of the column of the first reaction unit.

$Me_3SiCl$ is fed into the vessel (V) of the first reaction unit to the extent (customarily approximately 139 kg/h) that the proportion of hexamethyldisiloxane (formed from $Me_3SiCl$ and water) in the vessel (V) of the first reaction unit remains constant.

Water is fed into the vessel (V) of the column of the first reaction unit to the extent (customarily approximately 21.5 kg/h) that the proportion of water in the vessel (V) of the first reaction unit remains constant.

Slightly above the circulation evaporator (approximately 1 m), ethanol is fed in to the extent (customarily approximately 2.4 kg/h) that a constant temperature profile (from 50-82° C., depending on the measurement location) is obtained in the column. After a short period, a stable and constant distillate runback from the condensers of the first reaction unit of approximately 200-2501/h is established. Approximately 10-301/h of the distillate runback are conveyed directly into the vessel (V) of the first reaction unit, the remainder to the top of the column of the first reaction unit.

In the vessel (V) of the first reaction unit, there is a temperature of approximately 78° C. The reaction mixture comprising the desired organosiloxane is constantly taken off from the circulation evaporator to the extent to which it is formed, and fed to the top of the second reaction unit, beneath the condensation unit.

The temperature in the column of the second reaction unit is maintained at approximately 95-110° C. The temperature in the circulation evaporator of the second reaction unit is approximately 150-170° C. The condensate from the second reaction unit runs back into the vessel (V) of the first reaction unit.

The desired organosiloxane, that still comprises approximately 14-18% hexamethyldisiloxane and 0-15 ppm HCl, is continuously taken off from the circulation evaporator of the second reaction unit under constant conditions for a number of days. The analysis gave an M content of 77 mol % (without hexamethyldisiloxane), a Q content of 23 mol % (without hexamethyldisiloxane), an ethoxy content of 0.68 wt % and an OH content of 0.04 wt %.

On account of the low HCl content, the desired organosiloxane can be directly further worked up or stored.

Comparative Example 1:
Tetrakis(trimethylsiloxy)silane

The 135 l circulation evaporator of the first reaction unit is charged as follows:
  26.5 kg of the desired organosiloxane
  17 kg of hexamethyldisiloxane
  28.5 kg of ethanol
  7 kg of water The 135 l circulation evaporator of the second reaction unit is charged with 75 kg of the desired organosiloxane and 22 kg of hexamethyldisiloxane.

The reaction units are heated by means of the circulation evaporator until a stable distillation equilibrium is reached in the columns. Subsequently, the continuous metered addition is started as follows:

$SiCl_4$ is fed in at 48 kg/h 2 m below the top of the column of the first reaction unit.

$Me_3SiCl$ is fed in 3 m below the top of the column of the first reaction unit to the extent (customarily approximately 139 kg/h) that the proportion of hexamethyldisiloxane in the vessel (V) of the first reaction unit remains constant.

Water is fed into the vessel (V) of the first reaction unit to the extent (customarily approximately 21.5 kg/h) that the proportion of water in the vessel (V) of the first reaction unit remains constant.

Slightly above the circulation evaporator (approximately 1 m), ethanol is fed in to the extent (customarily approximately 2.4 kg/h) that a constant temperature profile (from 50-82° C., depending on the measurement location) is obtained in the column. After a short period, intensive distillate runback from the condensers of the first reaction unit is established. Approximately 10-30 l/h of the distillate runback are conveyed directly into the vessel (V) of the first reaction unit, the remainder to the top of the first reaction unit.

Within a few hours, the distillate runback from the condensers of the first reaction unit intensifies. An accumulation of $Me_3SiCl$ arises at the top, in the condensers and in the distillate runback lines of the first reaction unit. Condensate accumulates in the condensers, the distillate runback lines and in the column top. Hydrogen chloride gas and vaporous ethanol rise from the vessel (V) of the column of the first reaction unit and thereby prevent the accumulated condensate from running down. Accumulated liquid $Me_3SiCl$ does not react sufficiently with ethanol vapor (the cause is on the one hand the equilibrium between $Me_3SiOEt$ and $Me_3SiCl$ (also described above) when free from water (water already reacts in the bottom third of the column with Si-Hal units and also with intermediately formed alkoxysilanes) and on the other hand the significantly lower boiling point of $Me_3SiCl$ compared to ethanol), such that the accumulation of $Me_3SiCl$ intensifies to an ever greater extent, ultimately leading to termination and non-practicability of the process.

Example 2: Tetrakis(trimethylsiloxy)silane

The 135 l circulation evaporator of the first reaction unit is charged as follows:
  26.5 kg of the desired organosiloxane
  17 kg of hexamethyldisiloxane
  28.5 kg of ethanol
  7 kg of water The 135 l circulation evaporator of the second reaction unit is charged with 75 kg of the desired organosiloxane and 22 kg of hexamethyldisiloxane.

The reaction units are heated by means of the circulation evaporator until a stable distillation equilibrium is reached in the columns. Subsequently, the continuous metered addition is started as follows:

$SiCl_4$ is fed in at 84 kg/h 2 m below the top of the column of the first reaction unit.

Hexamethyldisiloxane is fed into the bottom of the column of the first reaction unit to the extent (customarily approximately 182 kg/h) that the proportion of hexamethyldisiloxane in the vessel (V) of the first reaction unit remains constant.

Water is fed into the vessel (V) of the first reaction unit to the extent (customarily approximately 17.8 kg/h) that the proportion of water in the vessel (V) of the first reaction unit remains constant.

Slightly above the circulation evaporator (approximately 1 m), ethanol is fed in to the extent (customarily approximately 4.2 kg/h) that a constant temperature profile (from 50-82° C., depending on the measurement location) is obtained in the column. After a short period, a stable and constant distillate runback from the condensers of the first reaction unit of approximately 340-410 l/h is established. Approximately 15-40 l/h of the distillate runback are conveyed directly into the vessel (V) of the first reaction unit, the remainder to the top of the first reaction unit.

In the vessel (V) of the first reaction unit, there is a temperature of approximately 78° C. The reaction mixture comprising the desired organosiloxane is constantly taken off from the circulation evaporator to the extent to which it is formed, and fed to the top of the second reaction unit, beneath the condensation unit.

The temperature in the column of the second reaction unit is maintained at approximately 95-110° C. The temperature in the circulation evaporator of the second reaction unit is approximately 150-170° C. The condensate from the second reaction unit runs back into the vessel (V) of the first reaction unit.

The desired organosiloxane, that still comprises approximately 14-18% hexamethyldisiloxane and 0-17 ppm HCl, is continuously taken off from the circulation evaporator of the second reaction unit under constant conditions for a number of days. The analysis gave an M content of 76 mol % (without hexamethyldisiloxane), a Q content of 24 mol % (without hexamethyldisiloxane), an ethoxy content of 0.78 wt % and an OH content of 0.05 wt %.

On account of the low HCl content, the desired organosiloxane can be directly further worked up or stored.

Example 3: Tetrakis(trimethylsiloxy)silane

The 135 l circulation evaporator of the first reaction unit is charged as follows:
  26.5 kg of the desired organosiloxane
  17 kg of hexamethyldisiloxane
  28.5 kg of ethanol
  7 kg of water The 135 l circulation evaporator of the second reaction unit is charged with 75 kg of the desired organosiloxane and 22 kg of hexamethyldisiloxane.

The reaction units are heated by means of the circulation evaporator until a stable distillation equilibrium is reached in the columns. Subsequently, the continuous metered addition is started as follows:

$SiCl_4$ is fed in at 75 kg/h 2 m below the top of the column of the first reaction unit.

$Me_3SiCl$ is fed into the bottom of the column of the first reaction unit to the extent (customarily approximately 217 kg/h) that the proportion of hexamethyldisiloxane (formed from Me₃SiCl and water) in the vessel (V) of the first reaction unit remains constant.

Water is fed into the vessel (V) of the first reaction unit to the extent (customarily approximately 34 kg/h) that the proportion of water in the vessel (V) of the first reaction unit remains constant.

Slightly above the circulation evaporator (approximately 1 m), ethanol is fed in to the extent (customarily approximately 3.8 kg/h) that a constant temperature profile (from 50-82° C., depending on the measurement location) is obtained in the column. After a short period, a stable and constant distillate runback from the condensers of the first reaction unit of approximately 300-380l/h is established. Approximately 10-40l/h of the distillate runback are conveyed directly into the vessel (V) of the first reaction unit, the remainder to the top of the first reaction unit.

In the vessel (V) of the first reaction unit, there is a temperature of approximately 78° C. The reaction mixture comprising the desired organosiloxane is constantly taken off from the circulation evaporator to the extent to which it is formed, cooled in a condenser to 30° C., and fed to a coalescer (volume of approximately 180l) for phase separation. The lower ethanolic acidic aqueous phase is conveyed into the vessel (V) of the first reaction unit and the upper siloxane phase is fed to the second reaction unit at the top, beneath the condensation unit.

The temperature in the column of the second reaction unit is maintained at approximately 95-110° C. The temperature in the circulation evaporator of the second reaction unit is approximately 150-170° C. The condensate from the second reaction unit runs back into the vessel (V) of the first reaction unit.

The desired organosiloxane, that still comprises approximately 12-16% hexamethyldisiloxane and 0-10 ppm HCl, is continuously taken off from the circulation evaporator of the second reaction unit under constant conditions for a number of days. The analysis gave an M content of 78 mol % (without hexamethyldisiloxane), a Q content of 22 mol % (without hexamethyldisiloxane), an ethoxy content of 0.89 wt % and an OH content of 0.06 wt %.

On account of the low HCl content, the desired organosiloxane can be directly further worked up or stored.

Example 4: Tetrakis(trimethylsiloxy)silane

The 135l circulation evaporator of the first reaction unit is charged as follows:
34 kg of the desired organosiloxane
10.5 kg of hexamethyldisiloxane
27.5 kg of ethanol
6.5 kg of water The 135l circulation evaporator of the second reaction unit is charged with 75 kg of the desired organosiloxane and 22 kg of hexamethyldisiloxane.

The reaction units are heated by means of the circulation evaporator until a stable distillation equilibrium is reached in the columns. Subsequently, the continuous metered addition is started as follows:

SiCl₄ is fed in at 48 kg/h 2 m below the top of the column of the first reaction unit.

Me₃SiCl is fed into the bottom of the column of the first reaction unit to the extent (customarily approximately 108 kg/h) that the proportion of hexamethyldisiloxane (formed from Me₃SiCl and water) in the vessel (V) of the first reaction unit remains constant.

Water is fed into the vessel (V) of the first reaction unit to the extent (customarily approximately 19.2 kg/h) that the proportion of water in the vessel (V) of the first reaction unit remains constant.

Slightly above the circulation evaporator (approximately 1 m), ethanol is fed in to the extent (customarily approximately 2.4 kg/h) that a constant temperature profile (from 50-82° C., depending on the measurement location) is obtained in the column. After a short period, a stable and constant distillate runback from the condensers of the first reaction unit of approximately 200-250l/h is established. Approximately 10-30l/h of the distillate runback are conveyed directly into the vessel (V) of the first reaction unit, the remainder to the top of the first reaction unit.

In the vessel (V) of the first reaction unit, there is a temperature of approximately 78° C. The reaction mixture comprising the desired organosiloxane is constantly taken off from the circulation evaporator to the extent to which it is formed, and fed to the top of the second reaction unit, beneath the condensation unit.

The temperature in the column of the second reaction unit is maintained at approximately 95-110° C. The temperature in the circulation evaporator of the second reaction unit is approximately 150-170° C. The condensate from the second reaction unit runs back into the vessel (V) of the first reaction unit.

The desired organosiloxane, that still comprises approximately 14-18% hexamethyldisiloxane and 0-13 ppm HCl, is continuously taken off from the circulation evaporator of the second reaction unit under constant conditions for a number of days.

The analysis gave an M content of 75 mol % (without hexamethyldisiloxane), a Q content of 25 mol % (without hexamethyldisiloxane), an ethoxy content of 0.57 wt % and an OH content of 0.03 wt %.

On account of the low HCl content, the desired organosiloxane can be directly further worked up or stored.

Example 5: Tris(trimethylsiloxy)methylsilane

The 135l circulation evaporator of the first reaction unit is charged as follows:
28 kg of the desired organosiloxane
15.5 kg of hexamethyldisiloxane
29 kg of ethanol
6.5 kg of water The 135l circulation evaporator of the second reaction unit is charged with 75 kg of the desired organosiloxane and 22 kg of hexamethyldisiloxane.

The reaction units are heated by means of the circulation evaporator until a stable distillation equilibrium is reached in the columns. Subsequently, the continuous metered addition is started as follows:

Me₃SiCl is fed in at 55 kg/h 2 m below the top of the column of the first reaction unit.

Me₃SiCl is fed into the bottom of the column of the first reaction unit to the extent (customarily approximately 148 kg/h) that the proportion of hexamethyldisiloxane (formed from Me₃SiCl and water) in the vessel (V) of the first reaction unit remains constant.

Water is fed into the vessel (V) of the first reaction unit to the extent (customarily approximately 25.5 kg/h) that the proportion of water in the vessel (V) of the first reaction unit remains constant.

Slightly above the circulation evaporator (approximately 1 m), ethanol is fed in to the extent (customarily approximately 2.8 kg/h) that a constant temperature profile (from 50-82° C., depending on the measurement location) is obtained in the column. After a short period, a stable and constant distillate runback from the condensers of the first reaction unit of approximately 220-280 l/h is established. Approximately 10-30 l/h of the distillate runback are conveyed directly into the vessel (V) of the first reaction unit, the remainder to the top of the first reaction unit.

In the vessel (V) of the first reaction unit, there is a temperature of approximately 78° C. The reaction mixture comprising the desired organosiloxane is constantly taken off from the circulation evaporator to the extent to which it is formed, and fed to the top of the second reaction unit, beneath the condensation unit.

The temperature in the column of the second reaction unit is maintained at approximately 95-110° C. The temperature in the circulation evaporator of the second reaction unit is approximately 150-170° C. The condensate from the second reaction unit runs back into the vessel (V) of the first reaction unit.

The desired organosiloxane, that still comprises approximately 14-18% hexamethyldisiloxane and 2-15 ppm HCl, is continuously taken off from the circulation evaporator of the second reaction unit under constant conditions for a number of days. The analysis gave an M content of 74 mol % (without hexamethyldisiloxane), a T content of 26 mol % (without hexamethyldisiloxane), an ethoxy content of 0.49 wt % and an OH content of 0.04 wt %.

On account of the low HCl content, the desired organosiloxane can be directly further worked up or stored.

Example 6: Tetrakis(vinyldimethylsiloxy)silane

The 135 l circulation evaporator of the first reaction unit is charged as follows:
26 kg of the desired organosiloxane
17.5 kg of 1,3-divinyl-1,1,3,3-tetramethyldisiloxane
28 kg of ethanol
6.5 kg of water The 135 l circulation evaporator of the second reaction unit is charged with 75 kg of the desired organosiloxane and 22 kg of 1,3-divinyl-1,1,3,3-tetramethyldisiloxane.

The reaction units are heated by means of the circulation evaporator until a stable distillation equilibrium is reached in the columns. Subsequently, the continuous metered addition is started as follows:

SiCl$_4$ is fed in at 70 kg/h 2 m below the top of the column of the first reaction unit.

Chloro(dimethyl)vinylsilane is fed into the bottom of the column of the first reaction unit to the extent (customarily approximately 225 kg/h) that the proportion of 1,3-divinyl-1,1,3,3-tetramethyldisiloxane (formed from 2-chloro(dimethyl)vinylsilane and water) in the vessel (V) of the first reaction unit remains constant.

Water is fed into the vessel (V) of the first reaction unit to the extent (customarily approximately 32 kg/h) that the proportion of water in the vessel (V) of the first reaction unit remains constant.

Slightly above the circulation evaporator (approximately 1 m), ethanol is fed in to the extent (customarily approximately 3.5 kg/h) that a constant temperature profile (from 50-82° C., depending on the measurement location) is obtained in the column. After a short period, a stable and constant distillate runback from the condensers of the first reaction unit of approximately 290-360 l/h is established. Approximately 10-40 l/h of the distillate runback are conveyed directly into the vessel (V) of the first reaction unit, the remainder to the top of the first reaction unit.

In the vessel (V) of the first reaction unit, there is a temperature of approximately 78° C. The reaction mixture comprising the desired organosiloxane is constantly taken off from the circulation evaporator to the extent to which it is formed, and fed to the top of the second reaction unit, beneath the condensation unit.

The temperature in the column of the second reaction unit is maintained at approximately 130-150° C. The temperature in the circulation evaporator of the second reaction unit is approximately 180-210° C. The condensate from the second reaction unit runs back into the vessel (V) of the first reaction unit.

The desired organosiloxane, that still comprises approximately 17-22% 1,3-divinyl-1,1,3,3-tetramethyldisiloxane and 1-14 ppm HCl, is continuously taken off from the circulation evaporator of the second reaction unit under constant conditions for a number of days. The analysis gave an M content of 77 mol % (without 1,3-divinyl-1,1,3,3-tetramethyldisiloxane), a Q content of 23 mol % (without 1,3-divinyl-1,1,3,3-tetramethyldisiloxane), an ethoxy content of 0.61 wt % and an OH content of 0.04 wt %.

On account of the low HCl content, the desired organosiloxane can be directly further worked up or stored.

Example 7:
Bis(ethyldimethylsiloxy)bis(trimethylsiloxy)silane

The 135 l circulation evaporator of the first reaction unit is charged as follows:
27 kg of the desired organosiloxane
7.4 kg of hexamethyldisiloxane
8.7 kg of 1,3-diethyl-1,1,3,3-tetramethyldisiloxane
29 kg of ethanol
7 kg of water The 135 l circulation evaporator of the second reaction unit is charged with 75 kg of the desired organosiloxane and 22 kg of 1,3-diethyl-1,1,3,3-tetramethyldisiloxane.

The reaction units are heated by means of the circulation evaporator until a stable distillation equilibrium is reached in the columns. Subsequently, the continuous metered addition is started as follows:

SiCl$_4$ is fed in at 48 kg/h 2 m below the top of the column of the first reaction unit.

A mixture composed of Me$_3$SiCl and EtMe2SiCl in a molar ratio of 1:1 is fed into the bottom of the column of the first reaction unit to the extent (customarily approximately 148 kg/h) that the proportion of hexamethyldisiloxane, 1,3-diethyl-1,1,3,3-tetramethyldisiloxane and 1-diethyl-1,1,3,3,3-pentamethyldisiloxane (formed from Me$_3$SiCl, EtMe2SiCl and water) in the vessel (V) of the first reaction unit remains constant.

Water is fed into the vessel (V) of the first reaction unit to the extent (customarily approximately 21.5 kg/h) that the proportion of water in the vessel (V) of the first reaction unit remains constant.

Slightly above the circulation evaporator (approximately 1 m), ethanol is fed in to the extent (customarily approximately 2.4 kg/h) that a constant temperature profile (from 50-82° C., depending on the measurement location) is obtained in the column. After a short period, a stable and constant distillate runback from the condensers of the first reaction unit of approximately 200-250 l/h is established. Approximately 10-30 l/h of the distillate runback are conveyed directly into the vessel (V) of the first reaction unit, the remainder to the top of the first reaction unit.

In the vessel (V) of the first reaction unit, there is a temperature of approximately 78° C. The reaction mixture comprising the desired organosiloxane is constantly taken off from the circulation evaporator to the extent to which it is formed, and fed to the top of the second reaction unit, beneath the condensation unit.

The temperature in the column of the second reaction unit is maintained at approximately 130-155° C. The temperature in the circulation evaporator of the second reaction unit is approximately 190-215° C. The condensate from the second reaction unit runs back into the vessel (V) of the first reaction unit.

The desired organosiloxane, that still comprises approximately 14-18% hexamethyldisiloxane, 1,3-diethyl-1,1,3,3-tetramethyldisiloxane and 1-diethyl-1,1,3,3,3-pentamethyldisiloxane and 2-17 ppm HCl, is continuously taken off from the circulation evaporator of the second reaction unit under constant conditions for a number of days. The analysis gave an M content of 76 mol % (without hexamethyldisiloxane, 1,3-diethyl-1,1,3,3-tetramethyldisiloxane and 1-diethyl-1,1,3,3,3-pentamethyldisiloxane), a Q content of 24 mol % (without hexamethyldisiloxane, 1,3-diethyl-1,1,3,3-tetramethyldisiloxane and 1-diethyl-1,1,3,3,3-pentamethyldisiloxane), an ethoxy content of 0.73 wt % and an OH content of 0.06 wt %.

On account of the low HCl content, the desired organosiloxane can be directly further worked up or stored.

Example 8: MDTQ Resin

The 135l circulation evaporator of the first reaction unit is charged as follows:
36.5 kg of the desired organosiloxane
7 kg of hexamethyldisiloxane
28.5 kg of ethanol
7 kg of water The 135l circulation evaporator of the second reaction unit is charged with 75 kg of the desired organosiloxane and 22 kg of hexamethyldisiloxane.

The reaction units are heated by means of the circulation evaporator until a stable distillation equilibrium is reached in the columns. Subsequently, the continuous metered addition is started as follows:

$SiCl_4$ is fed in at 44 kg/h and $Me_3SiCl$ at 23 kg/h 2 m below the top of the column of the first reaction unit.

$Me_3SiCl$ is fed into the bottom of the column of the first reaction unit to the extent (customarily approximately 56 kg/h) that the proportion of hexamethyldisiloxane (formed from $Me_3SiCl$ and water) in the vessel (V) of the first reaction unit remains constant. Approximately 3.3 kg/h of $Me_2SiCl_2$ are fed to the bottom of the column of the first reaction unit.

Water is fed into the vessel (V) of the first reaction unit to the extent (customarily approximately 18.5 kg/h) that the proportion of water in the vessel (V) of the first reaction unit remains constant.

Slightly above the circulation evaporator (approximately 1 m), ethanol is fed in to the extent (customarily approximately 4.1 kg/h) that a constant temperature profile (from 50-82° C., depending on the measurement location) is obtained in the column. After a short period, a stable and constant distillate runback from the condensers of the first reaction unit of approximately 230-280l/h is established. Approximately 10-40l/h of the distillate runback are conveyed directly into the vessel (V) of the first reaction unit, the remainder to the top of the first reaction unit.

In the vessel (V) of the first reaction unit, there is a temperature of approximately 78° C. The reaction mixture comprising the desired organosiloxane is constantly taken off from the circulation evaporator to the extent to which it is formed, and fed to the top of the second reaction unit, beneath the condensation unit.

The temperature in the column of the second reaction unit is maintained at approximately 95-110° C. The temperature in the circulation evaporator of the second reaction unit is approximately 150-170° C. The condensate from the second reaction unit runs back into the vessel (V) of the first reaction unit.

The desired organosiloxane, that still comprises approximately 12-16% hexamethyldisiloxane and 3-17 ppm HCl, is continuously taken off from the circulation evaporator of the second reaction unit under constant conditions for a number of days.

The analysis gave an M content of 46 mol % (without hexamethyldisiloxane), a D content of 3 mol % (without hexamethyldisiloxane), a T content of 19 mol % (without hexamethyldisiloxane), and a Q content of 32 mol % (without hexamethyldisiloxane), an ethoxy content of 2.29 wt % and an OH content of 0.41 wt %.

On account of the low HCl content, the desired organosiloxane can be directly further worked up or stored. In order to determine the molecular weight, the desired organosiloxane had hexamethyldisiloxane removed therefrom by means of a thin film evaporator under vacuum. The desired organosiloxane has a molecular weight Mw of 1814 g/mol.

The invention claimed is:

1. A continuous method for producing organosiloxanes (O) by reacting at least one silicon compound 1 of formula 1

$$R_nSiHal_{4-n} \tag{1}$$

and at least one silicon compound 2, which comprise silicon compounds of formula 2a, silicon compounds of formula 2b, or mixtures of silicon compounds of formulae 2a and 2b $$R^1{}_3SiHal \tag{2a}$$

$$R^1{}_3Si-O-SiR^1{}_3 \tag{2b}$$

wherein
R is hydrogen or a $C_1$-$C_{12}$ hydrocarbon radical,
$R^1$ is hydrogen or a $C_1$-$C_7$ hydrocarbon radical,
Hal is fluorine, chlorine, bromine or iodine, and
n has a value of 0 or 1,
with alcohol and water in the presence of organosiloxane (O) in a first reaction unit comprising a distillation column and a vessel (V) containing organosiloxane (O) arranged thereunder, wherein the content of the vessel is heated to boiling under reflux, the at least one silicon compound 1 is introduced into the column above the lower end of the column, the at least one silicon compound 2 is introduced into the vessel (V), hydrogen halide formed by the reaction is removed by means of the distillation column, and organosiloxane (O) is constantly drawn off from the vessel (V) to an extent to which is it formed, wherein the at least one silicon compound 1, the at least one silicon compound 2, alcohol and water are constantly supplied to the reaction unit in such amounts that there is always more water contained in the first reaction unit than can be consumed by the at least one silicon compound 1 and at least one silicon compound 2 supplied to the first reaction unit.

2. The method of claim 1, wherein silicon compounds 1 and 2, alcohol and water are introduced into the first reaction unit in such amounts that there is at least 3 wt % of water present in the vessel (V), based on the total weight of the liquid phase in the vessel (V).

3. The method of claim 1, wherein silicon compounds 1 and 2, alcohol and water are introduced into the first reaction unit in such amounts that there is at least 20 wt % of alcohol present in the vessel (V), based on the total weight of the liquid phase in the vessel (V).

4. The method of claim 2, wherein silicon compounds 1 and 2, alcohol and water are introduced into the first reaction unit in such amounts that there is at least 20 wt % of alcohol present in the vessel (V), based on the total weight of the liquid phase in the vessel (V).

5. The method of claim 1, wherein the $C_1$-$C_7$ or $C_1$-$C_{12}$ hydrocarbon radicals R and $R^1$ are selected from the group consisting of methyl, ethyl, vinyl, n-propyl, i-propyl, n-butyl, i-butyl, n-pentyl, i-pentyl, n-hexyl, i-hexyl, cyclohexyl, n-heptyl, n-octyl, i-octyl, phenyl, tolyl radicals, and mixtures thereof.

6. The method of claim 1, wherein the halogen atom Hal is chlorine.

7. The method of claim 1, wherein additionally silicon compound 3

$$R^1{}_2SiHal_2 \qquad (3),$$

is introduced into the vessel (V) or into the column above a lower end of the column.

8. The method of claim 1, wherein the alcohol corresponds to the formula R"OH, in which R" is a monovalent aliphatic hydrocarbon radical having 1 to 8 carbon atoms.

9. The method of claim 1, wherein the mixture comprising the organosiloxane (O) obtained from the first reaction unit is passed into a second reaction unit and heated there to a temperature at which volatile constituents are completely or partially removed from the mixture, wherein the volatile constituents are recycled from the second reaction unit back into the first reaction unit, and organosiloxane (O) is constantly drawn off from the bottom of the second reaction unit to the extent to which is it formed.

10. The method of claim 1, wherein the amount of hydrogen halide dissolved in a liquid phase of vessel (V) is 40,000 to 100,000 ppm, based on the total weight of the liquid phase in the vessel (V) of the first reaction unit.

11. The method of claim 1, wherein the concentration of hydrogen halide is controlled by introducing an inert gas into the vessel (V) of the first reaction unit.

12. The method of claim 9, wherein the concentration of hydrogen halide is controlled by introducing an inert gas into the column bottom of the second reaction unit.

13. The method of claim 9, wherein a phase separation unit is positioned between the first and second reaction unit.

* * * * *